United States Patent
Nakano

(10) Patent No.: US 8,256,479 B2
(45) Date of Patent: Sep. 4, 2012

(54) PNEUMATIC TIRE

(75) Inventor: Tomoya Nakano, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 892 days.

(21) Appl. No.: 12/293,523

(22) PCT Filed: May 23, 2007

(86) PCT No.: PCT/JP2007/060527
§ 371 (c)(1),
(2), (4) Date: Sep. 18, 2008

(87) PCT Pub. No.: WO2007/136091
PCT Pub. Date: Nov. 29, 2007

(65) Prior Publication Data
US 2010/0000648 A1    Jan. 7, 2010

(30) Foreign Application Priority Data

May 24, 2006  (JP) ................................ 2006-144061
Sep. 1, 2006  (JP) ................................ 2006-237881

(51) Int. Cl.
B60C 3/00  (2006.01)
B60C 3/04  (2006.01)
B60C 13/00  (2006.01)
B60C 13/02  (2006.01)

(52) U.S. Cl. ....................................... 152/454; 152/523

(58) Field of Classification Search ................. 152/454, 152/523, 524, 525
See application file for complete search history.

(56) References Cited

U.S. PATENT DOCUMENTS

| 1,567,402 | A | * | 12/1925 | Venn ................................ 425/35 |
| 4,198,774 | A | * | 4/1980 | Roberts et al. .................... 40/587 |
| 4,343,342 | A | * | 8/1982 | McDonald ...................... 152/523 |
| 5,196,076 | A | * | 3/1993 | Ochiai ........................... 152/454 |
| 6,253,815 | B1 | * | 7/2001 | Kemp et al. .................... 152/523 |
| 6,612,352 | B1 | * | 9/2003 | Barrese et al. ................. 152/523 |

(Continued)

FOREIGN PATENT DOCUMENTS

JP   58-180706   12/1983

(Continued)

*Primary Examiner* — Joseph Del Sole
*Assistant Examiner* — Ryan Ochylski
(74) *Attorney, Agent, or Firm* — Greer, Burns & Crain, Ltd.

(57) ABSTRACT

A pneumatic tire according to the present invention enhances visibility of a mark formed on a sidewall portion, and reduces cure trouble due to an air pocket produced during molding of the mark.

Two circumferential projections 9 extending in the circumferential direction of the tire are disposed on the surface 2a of a sidewall portion 2 at a prescribed distance in the radial direction of the tire. At least two radial projections 10 extending in the radial direction of the tire and connected to the two circumferential projections 9 are disposed at a prescribed distance in the circumferential direction of the tire between the two circumferential projections 9. A region defined by the circumferential projections 9 and radial projections 10 is formed in a depression surface 11 depressed from the surface 2a of the sidewall portion 2. At least one mark 8 protruding beyond the surface 2a of the sidewall portion 2 is provided on the depression surface 11. The height H1 of the mark 8 from the surface 2a of the sidewall portion 2 is equal to or less than the heights H2 of the circumferential projections 9 from the surface 2a of the sidewall portion 2 and the heights H3 of the radial projections 10 from the surface 2a of the sidewall portion 2.

10 Claims, 8 Drawing Sheets

U.S. PATENT DOCUMENTS

| | | | |
|---|---|---|---|
| 2003/0084979 A1* | 5/2003 | Matsumoto | 152/523 |
| 2005/0081975 A1* | 4/2005 | Sano | 152/523 |
| 2006/0254689 A1* | 11/2006 | Wallet | 152/523 |
| 2007/0044886 A1* | 3/2007 | Lo | 152/523 |

FOREIGN PATENT DOCUMENTS

| | | | |
|---|---|---|---|
| JP | 59-99730 | | 7/1984 |
| JP | A 2-253904 | | 10/1990 |
| JP | 03189206 A | * | 8/1991 |
| JP | A 6-48109 | | 2/1994 |
| JP | A 6-55915 | | 3/1994 |
| JP | A 10-67208 | | 3/1998 |
| JP | A 2004-34860 | | 2/2004 |
| JP | 2005125937 A | * | 5/2005 |

* cited by examiner

PNEUMATIC TIRE

This application is a U.S. National Phase under 35 U.S.C. §371 of International Application No. PCT/JP2007/060527, filed May 23, 2007.

TECHNICAL FIELD

The present invention relates to pneumatic tires, and more particularly, to a pneumatic tire which enhances visibility of a mark formed on a sidewall portion, and reduces cure trouble due to an air pocket produced during molding of the mark.

TECHNICAL BACKGROUND

In order to indicate a maker's name, brand name, etc. on the surface of a sidewall portion of a tire, marks comprising alphabets, figures, symbols, etc. protrude from the surface of the sidewall portion. Such marks are conventionally structured such that the projection heights of the marks are as high as possible to enhance visibility of the marks. However, when the projection heights of the marks become high, air pockets are produced arising from bad rubber flow during molding of the marks, creating a problem of cure trouble.

In order to solve the above problem, various approaches have conventionally been devised for enhancing visibility of the marks and for remedying bad rubber flow during molding of the marks to alleviate cure trouble due to the air pockets by adequately arranging shapes of the marks formed on the sidewall portion (see patent documents 1 and 2, for example).

However, any of the approaches is not sufficient yet to realize both enhancement of visibility of the marks and prevention of cure trouble due to bad rubber flow, which are warring aspects; there is still room for improvement.

Patent Document 1: Japanese Patent Application Kokai Publication HEI 6-55915
Patent Document 2: Japanese Patent Application Kokai Publication HEI 10-67208

DISCLOSURE OF THE INVENTION

Problems to be Solved by the Invention

An object of the present invention is to provide a pneumatic tire capable of enhancing visibility of a mark formed on a sidewall portion and alleviating cure trouble due to an air pocket produced during molding of the mark.

Means for Solving the Problems

In order to achieve the above object, the present invention provides a pneumatic tire including a sidewall portion having a surface, two circumferential projections extending in a circumferential direction of the tire being disposed on the surface of the sidewall portion at a prescribed distance in a radial direction of the tire, at least two radial projections extending in the radial direction of the tire and connected to the two circumferential projections being disposed at a prescribed distance in the circumferential direction of the tire between the two circumferential projections, a region defined by the circumferential projections and radial projections being formed in a depression surface depressed from the surface of the sidewall portion, at least one mark protruding beyond the surface of the sidewall portion being provided on the depression surface, a height of the mark from the surface of the sidewall portion being equal to or less than heights of the circumferential projections from the surface of the sidewall portion and heights of the radial projections from the surface of the sidewall portion.

EFFECTS OF THE INVENTION

According to the present invention described above, the circumferential projections and radial projections connected thereto are provided on the surface of the sidewall portion, the region defined by the circumferential projections and radial projections is formed in the depression surface, the mark projecting beyond the surface of the sidewall portion is formed on the depression surface, and the height of the mark is specified as mentioned above, whereby air trapped between the mark and a recess of a mold for molding the mark can effectively escape through between the depression surface depressed inward of the tire and the inner surface of the mold into grooves of the mold for molding the circumferential projections and radial projections. Therefore, cure trouble due to an air pocket created during molding of the mark can be improved.

On the other hand, the mark is formed in the surface of the sidewall portion in a state where the mark is surrounded by the circumferential projections and radial projections projecting from the surface of the sidewall portion and in a state where it protrudes from the depression surface depressed inward of the tire beyond the surface of the sidewall portion. Therefore, visibility of the mark can be enhanced.

DESCRIPTION OF THE SYMBOLS

| | |
|---|---|
| 1 | tread portion |
| 2 | sidewall portion |
| 2a | surface |
| 3 | bead portion |
| 8 | mark |
| 8m | projection |
| 8n | part |
| 9, 9a, 9b | circumferential projection |
| 10 | radial projection |
| 11 | depression surface |
| 13, 13A | auxiliary projection |
| 13A1 | one end |
| 13A2 | the other end |
| 14 | space |

BEST MODES FOR CARRYING OUT THE INVENTION

Embodiments of the present invention will be described in detail below with reference to the attached drawings.

Figure 1:
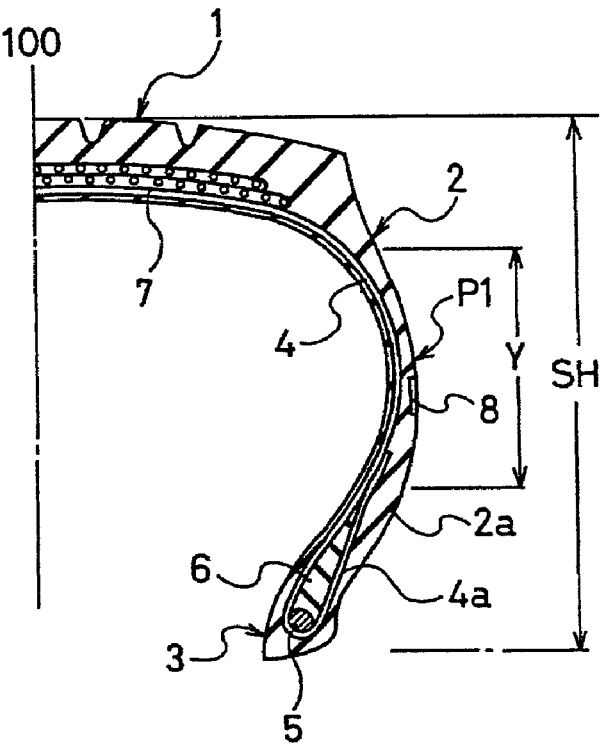
FIG. 1 is a half cross-sectional view showing an embodiment of a pneumatic tire according to the present invention.

In FIG. 1, reference numeral 1 denotes a tread portion, reference numeral 2 a sidewall portion, reference numeral 3 a bead portion, and reference numeral 100 an equatorial plane of the tire. A carcass ply 4 extends between the right and left bead portions 3, the carcass ply including a rubber layer and reinforcing cords embedded therein, the reinforcing cords extending in the radial direction of the tire being arranged at prescribed intervals in the circumferential direction of the tire. The carcass ply has opposite ends 4a, which are turned up around bead cores 5 embedded in the bead portions 3 from the inner side toward the outer side in the axial direction of the tire with bead fillers 6 being sandwiched. A plurality of belt plies 7 are provided radially outwardly of the carcass ply 4 in the tread portion 1, the belt plies having rubber layers and reinforcing cords such as steel cords embedded therein, the reinforcing cords being arranged in an inclined manner with respect to the circumferential direction of the tire.

A sidewall portion 2 has a surface 2a, which has an area Y where convexed marks 8 comprising alphabets, figures, symbols, etc. are formed between a position away inward in the radial direction of the tire from a maximum width position P1 of the tire by a length of ¼ of the cross-sectional height SH of the tire and a position away outward in the radial direction of the tire from the maximum width position P1 of the tire by a length of ¼ of the cross-sectional height SH of the tire.

Figure 2:
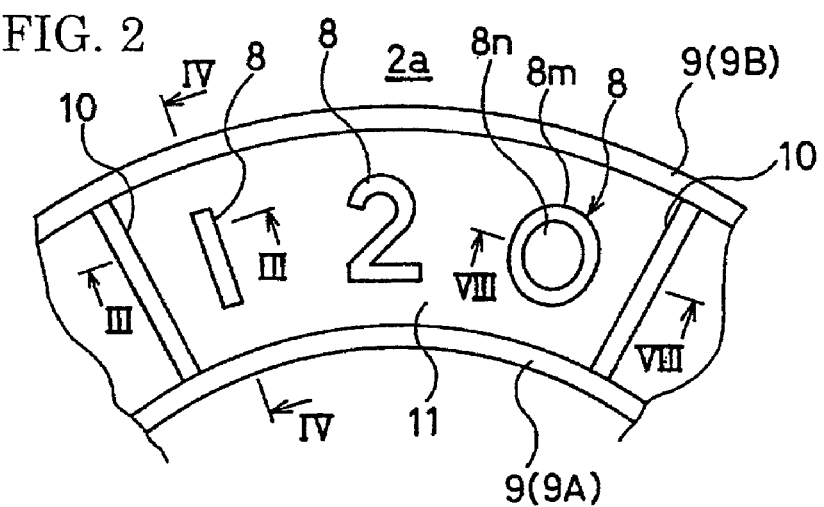
FIG. 2 is a partial enlarged view showing marks formed on the tire of FIG. 1.
Figure 3:
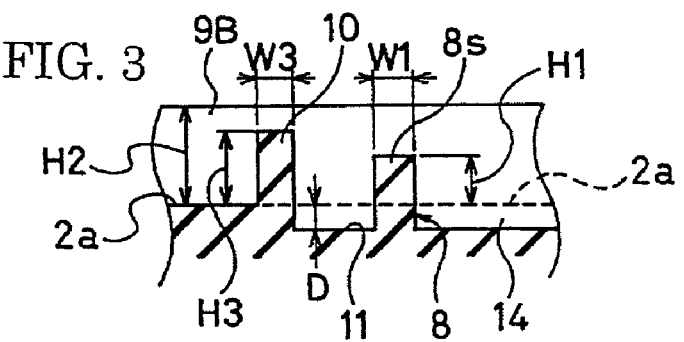
FIG. 3 is a cross-sectional view taken along line III-III of FIG. 2.
Figure 4:
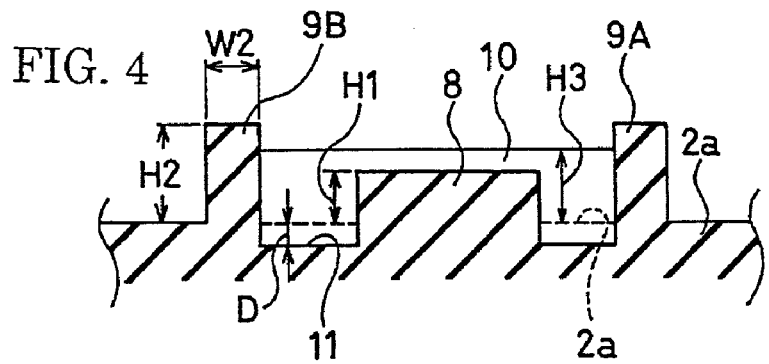
FIG. 4 is a cross-sectional view taken along line IV-IV of FIG. 2.

In the area Y, as shown in FIG. 2, two circumferential projections 9 (9A and 9B) extending annularly along the circumferential direction of the tire are provided on the surface 2a of the sidewall portion 2 at a prescribed distance in the radial direction of the tire. Further, in the area Y, at least two radial projections 10 which extend in the radial direction of the tire and are connected to the two circumferential projections 9A and 9B are provided on the surface 2a of the sidewall portion 2 at a prescribed distance in the circumferential direction of the tire. A region defined by the circumferential projections 9A and 9B and radial projections 10 is formed, as shown in FIGS. 3 and 4, in a depression surface 11 depressed by a depth D from the surface 2a of the sidewall portion 2. The marks 8 protrude from the depression surface 11 so as to project beyond the surface 2a of the sidewall portion 2.

The heights H1 of the marks 8 from the surface 2a of the sidewall portion 2 are equal to or less than the heights H2 of the circumferential projections 9A and 9B from the surface 2a of the sidewall portion 2, and are equal to or less than the heights H3 of the radial projections 10 from the surface 2a of the sidewall portion 2.

Figure 5:
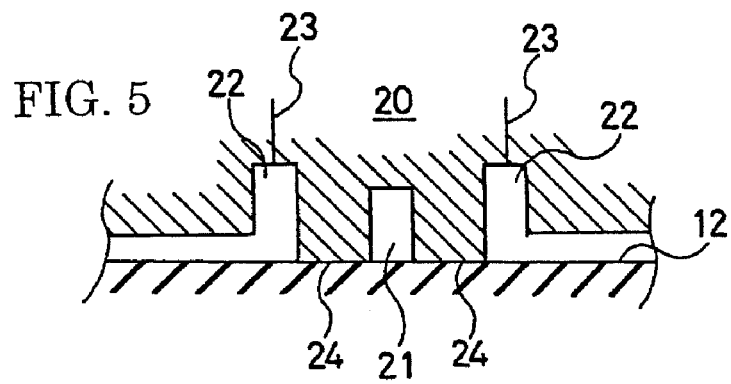
FIG. 5 is an explanatory drawing in cross section illustrating flow of uncured rubber of a mark during curing of the tire.
Figure 6:
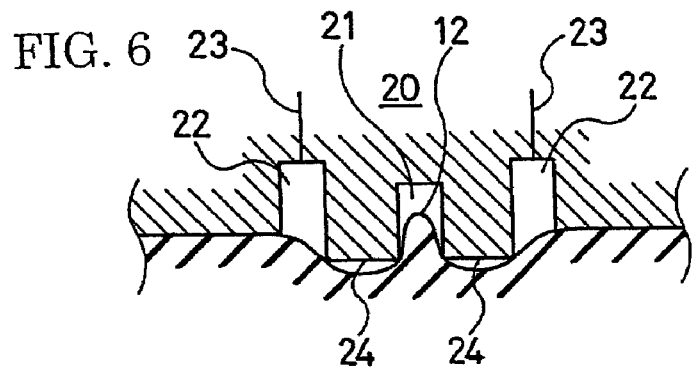
FIG. 6 is an explanatory drawing in cross section illustrating flow of the uncured rubber following FIG. 5.
Figure 7:
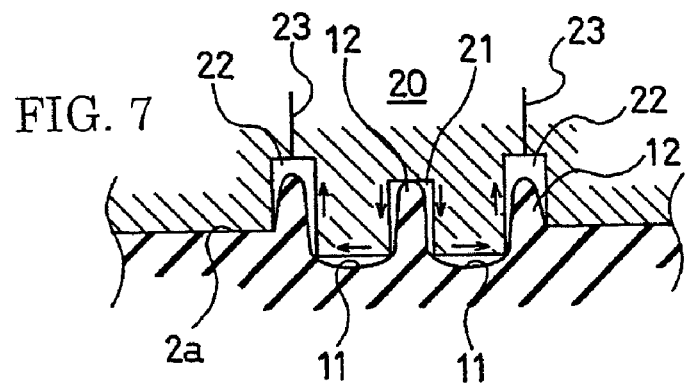
FIG. 7 is an explanatory drawing in cross section illustrating flow of the uncured rubber following FIG. 6 and flow of trapped air.

Thus, as shown in FIG. 5, uncured rubber 12 constituting the sidewall portion 2 first comes into contact with a convex surface 24 of a mold 20 for molding the depression surface 11. Next, as shown in FIG. 6, the uncured rubber 12 flows into mark-molding recesses 21 of the mold 20, and then flows into grooves 22 of the mold 20 for molding the circumferential projections 9 and radial projections 10. As shown in FIG. 7, the uncured rubber 12 first flows up to the bottoms of the mark-molding recesses 21 of the mold 20. Therefore, air trapped between the uncured rubber 12 and wall surfaces facing the mark-molding recesses 21 is pushed out by the uncured rubber 12 which has flown thereinto, and escapes into the grooves 22 of the mold 20 partially filled with the uncured rubber 12 through between the convex surface 24 and a portion of the uncured rubber 12 for forming the depression surface 11 as shown in arrows. Accordingly, cure trouble due to air pockets produced during molding of the marks 8 is alleviated. The air which has escaped into the grooves 22 of the mold 20 is discharged outside through ventholes 23 for air release.

According to the present invention described above, the marks 8 are formed in the surface 2a of the sidewall portion 2 in a state where the marks 8 are surrounded by the circumferential projections 9A and 9B and radial projections 10 projecting from the surface 2a of the sidewall portion 2, and in shapes projecting from the depression surface 11 depressed inward of the tire beyond the surface 2a of the sidewall portion 2, which enables visibility of the marks 8 to be enhanced.

By protruding the marks 8 from the depression surface 11 and specifying the heights H1 thereof with respect to the heights H2 of the circumferential projections 9A and 9B and the heights H3 of the radial projections 10 as described above, a good rubber flow during molding of the marks is yielded, enabling cure trouble due to air pockets to be improved.

If the heights H1 of the marks 8 are greater than the heights H2 of the circumferential projections 9A and 9B, air pockets are apt to occur during molding of the marks. The same goes for the case where the heights H1 of the marks 8 are greater than the heights H3 of the radial projections 10. The heights H1 of the marks 8 are preferably less than the heights H2 of the circumferential projections 9A and 9B and the heights H3 of the radial projections 10.

Figure 8:
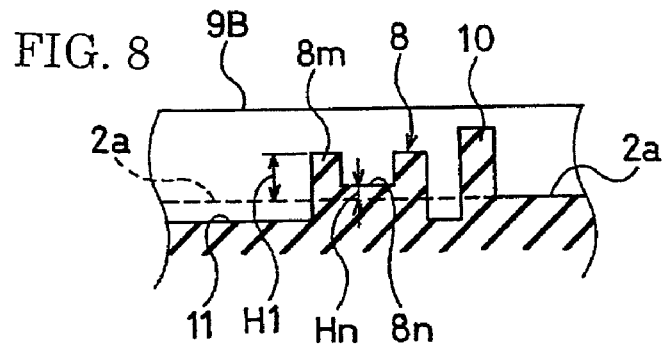
FIG. 8 is a cross-sectional view taken along line VIII-VIII of FIG. 2.
Figure 9:
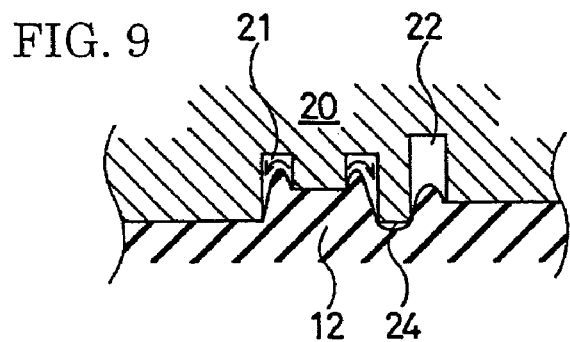
FIG. 9 is an explanatory drawing in cross section illustrating flow of uncured rubber forming a mark in FIG. 8.

In the present invention, when the marks include a mark 8, such as "O" shown on the right side in FIG. 2, having an annular projection 8m and a part 8n surrounded thereby, the part 8*n* is preferably higher than the surface 2*a* of the sidewall portion 2 as shown in FIG. 8. This allows air in the mark-molding recess 21 to readily escape into the grooves 22 of the mold 20 for molding the circumferential projections 9 and radial projections 10 into which the uncured rubber 12 has partially flowed, through between the convex surface 24 and a portion of the uncured rubber 12 for forming the depression surface 11 as shown in arrows.

The part 8*n* has a height Hn. If the height Hn is greater than that of the surface 2*a* of the sidewall portion 2, it is sufficient. The upper limit of the height Hn of the part 8*n* is preferably equal to or less than 0.25 times the height H1 of the mark 8 from the viewpoint of visibility of the mark 8.

Figure 10:
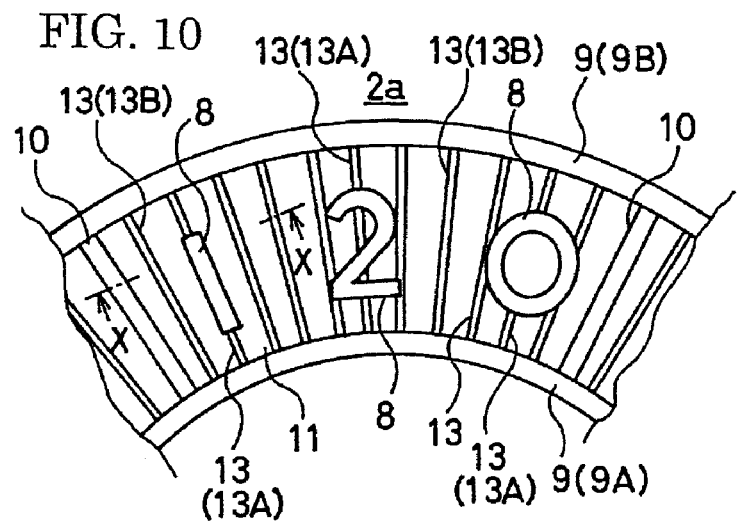
FIG. 10 is a partial enlarged view showing marks formed on a sidewall portion in another embodiment of a pneumatic tire according to the present invention.
Figure 11:
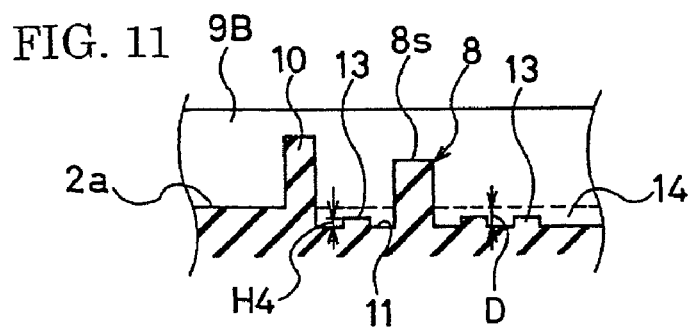
FIG. 11 is a cross-sectional view taken along line X-X of FIG. 10.

Referring to FIG. 10, there is shown another embodiment of a pneumatic tire according to the present invention, the marks 8 of which formed on the surface 2*a* of a sidewall portion 2 are partially shown. In the embodiment of FIG. 10, in addition to the marks 8 described above, a plurality of auxiliary projections 13 extending along the radial direction of the tire are further formed at prescribed intervals in the circumferential direction of the tire on the depression surface 11 in a region defined by the circumferential projections 9A and 9B and radial projections 10. The plurality of auxiliary projections 13 comprise first auxiliary projections 13A having one ends connected to the marks 8 and the other ends connected to a circumferential projection 9, and second auxiliary projections 13B having opposite ends connected to the circumferential projections 9A and 9B. The auxiliary projections 13 each have a height H4 as shown in FIG. 11, and the ratio H4/D of the height H4 to the depth D of the depression surface 11 satisfies a relationship expressed by $0.6 \leq H4/D \leq 1.0$.

By connecting the marks 8 to the circumferential projection 9 via the first auxiliary projections 13A as described above, air trapped between the marks 8 and wall surfaces facing the mark-molding depressions can escape into a groove of a mold for molding the circumferential projection through grooves of the mold for molding the first auxiliary projections 13A. Further, by connecting the opposite ends of the second auxiliary projections 13B to the circumferential projections 9A and 9B, air trapped between the depression surface 11 and the inner surface of the mold can effectively escape into the grooves of the mold for molding the circumferential projections 9A and 9B through grooves of the mold for molding the second auxiliary projections 13B. Therefore, cure trouble due to air pockets produced during molding of the marks can be further improved.

If the ratio H4/D is less than 0.6, the grooves of the mold for molding the auxiliary projections 13 is so shallow that trapped air can not effectively escape. If the ratio H4/D is beyond 1.0, visibility of the marks 8 is deteriorated.

The auxiliary projections 13 are preferably provided at prescribed intervals as described above. However, it is sufficient to provide at least one auxiliary projection 13 as required. In this case, at least one auxiliary projection 13A is preferably provided in terms of further reducing air pockets produced during molding of the mark.

Figure 12:
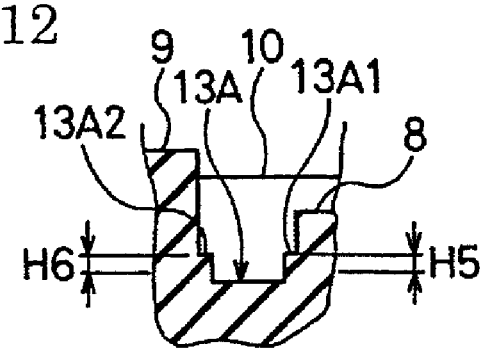
FIG. 12 is a cross-sectional view showing a preferred example of an auxiliary projection.

It is preferably that, as shown in FIG. 12, each auxiliary projection 13A have one raised end 13A1 connected to a mark 8, the one raised end 13A1 having a height H5, from the surface 2*a* of the sidewall portion 2, of 0.2 to 0.8 times the height H1 of the mark 8. It is also preferably that, as shown in FIG. 12, the auxiliary projection 13A have the other raised end 13A2 connected to a circumferential projection 9, the other raised end 13A2 having a height H6, from the surface 2*a* of the sidewall portion, of 0.2 to 1.0 times the height H2 of the circumferential projection 9, 9B. This allows air trapped between the mark 8 and the inner surface of the mold during tire curing to more effectively escape into the groove of the mold for molding the circumferential projection 9 via the groove of the mold for molding the auxiliary projection 13A, which can further improve cure trouble due to air pockets produced during molding of the mark 8.

If the height H5 of the one end 13A1 of the auxiliary projection 13A is less than 0.2 times the height H1 of the mark 8, and if the height H6 of the other end 13A2 of the auxiliary projection 13A is less than 0.2 times the height H2 of the circumferential projection 9, an effect of escaping trapped air is reduced. If the height H5 of the one end 13A1 of the auxiliary projection 13A is greater than 0.8 times the height H1 of the mark 8, visibility of the mark 8 is deteriorated. Even if the height H6 of the other end 13A2 of the auxiliary projection 13A is greater than 1.0 times the height H2 of the circumferential projection 9, an effect of escaping trapped air is not changed. Therefore, the upper limit of the height H6 of the other end 13A2 of the auxiliary projection 13A is 1.0 times the height H2 of the circumferential projection 9.

In the present invention, when a plurality of marks 8 protrude from the depression surface 11 formed in the region defined by the circumferential projections 9A and 9B and radial projections 10 as described above, the marks 8 have portions 8*s* projecting beyond the surface 2*a* of the sidewall portion 2, the portions 8*s* having volumes. The sum of the volumes is preferably in the range of 0.7 to 1.3 times the volume of a space 8*s* from the surface 2*a* of the sidewall portion 2 to the depression surface 11 in terms of remedying a bad flow of rubber around the marks 8, and further alleviating cure trouble due to air pockets. If the auxiliary projections 13 are provided, the space 14 is a space from the surface 2*a* of the sidewall portion 2 to the depression surface 11 including the auxiliary projections 13.

Figure 13:
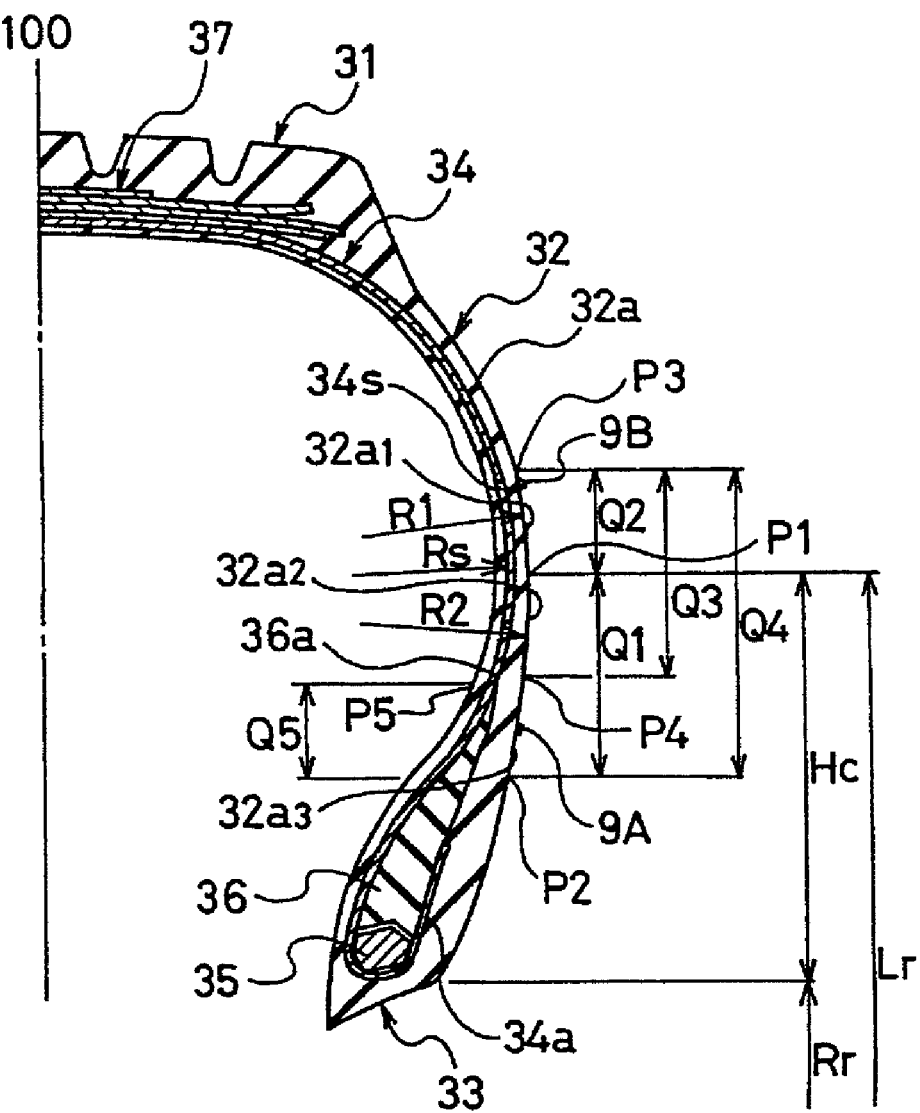
FIG. 13 is a half cross-sectional view showing still another embodiment of a pneumatic tire according to the present invention.

Referring to FIG. 13, there is shown still another embodiment of a pneumatic tire according to the present invention. The pneumatic tire shown in FIG. 13 is a heavy duty pneumatic tire used for trucks, buses and the like; reference numeral 31 denotes a tread portion, reference numeral 32 a sidewall portion, reference numeral 33 a bead portion, and reference numeral 100 an equatorial plane of the tire.

A carcass ply 34 extends between the right and left bead portions 33, the carcass ply having a rubber layer and reinforcing cords embedded therein, the reinforcing cords extending in the radial direction of the tire being arranged at prescribed intervals in the circumferential direction of the tire. The carcass ply has opposite ends 34*a*, which are turned up about bead cores 35 embedded in the bead portions 33 from the inner side to the outer side in the axial direction of the tire with bead fillers 36 being sandwiched. A plurality of belt plies 37 are provided radially outwardly of the carcass ply 34 in the tread portion 31, the belt plies having rubber layers and reinforcing cords such as steel cords embedded therein, the reinforcing cords being arranged in an inclined manner with respect to the circumferential direction of the tire.

Each of the bead fillers 36 disposed radially outwardly of the bead cores 35 is formed of rubber having a hardness higher than that of rubber constituting a sidewall portion 32, acts as a reinforcing member, and extends from the bead portion 33 side toward the sidewall portion 32 side in the form of a triangle in cross section. The bead filler 36 has a radially outer edge 36*a*, which is located in a region Q1 of the sidewall portion from the tire maximum width position P1, inward in the radial direction of the tire orthogonal to the axis of rotation of the tire, to a position P2 of ½ of a tire cross-sectional height Hc up to the tire maximum width position P1. The sidewall portion region Q1 is a region where the radially outer edge of each bead filler of a general heavy duty pneumatic tire is placed. Note that the tire cross-sectional height Hc referred here is a difference between a length Lr in the radial direction of the tire from the axis of rotation of the tire to the position P1 and a radius Rr of the rim of a wheel on which the tire is mounted.

The sidewall portion 32 has a surface 32a. The surface 32a of the sidewall portion 32 has a portion $32a_1$ located in a region Q2 of the sidewall portion from the tire maximum width position P1 to a position P3 away therefrom outward in the radial direction of the tire orthogonal to the axis of rotation of the tire by a distance of ¼ of the tire cross-sectional height Hc. The portion $32a_1$ has a cross-sectional shape taken in a plane that contains the axis of rotation of the tire, the cross-sectional shape being in the form of an arc having a curvature radius R1. The surface 32a of the sidewall portion 32 has a portion $32a_2$ located in the sidewall portion region Q1. The portion $32a_2$ has a cross-sectional shape taken in a plane that contains the axis of rotation of the tire, the cross-sectional shape being in the form of an arc having a curvature radius R2. The sidewall portion has a region Q3 from a position P4 away from the tire maximum width position P1 inward in the radial direction of the tire orthogonal to the axis of rotation of the tire by a distance of ¼ of the tire cross-sectional height Hc to the position P3. The carcass ply 34 has a portion 34s in the region Q3. The portion 34s has a cross-sectional shape taken in a plane that contains the axis of rotation of the tire, the cross-sectional shape being in the form of an arc having a curvature radius Rs. The curvature radii R1, R2 and Rs satisfy relationships expressed by Rs<R1 and 3.0R1≦R2. In the case of heavy duty pneumatic tires, the curvature radius R1 can be in the range of 50 mm to 200 mm, the curvature radius R2 can be in the range of 200 mm to 800 mm, and the curvature radius Rs can be in the range of 30 mm to 180 mm. The curvature radii R1, R2 and Rs are suitably selected according to the size of a tire.

Figure 14:
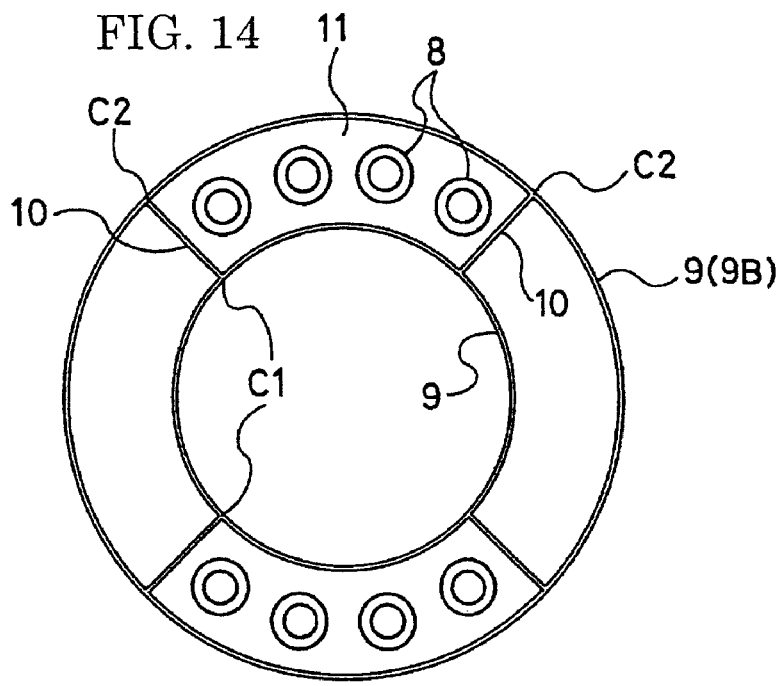
FIG. 14 is an explanatory drawing of marks in FIG. 13 seen from the direction of one side of the tire.

In the embodiment of FIG. 13, the above-described marks 8, circumferential projections 9A and 9B and radial projections 10 are provided in a region Q4 of the sidewall portion from the position P2 to the position P3. More specifically, the sidewall portion has a region Q5 from a position P2 of the radially outer edge 36a of the bead filler 36 to the position P2. The surface 32a of the sidewall portion 32 has a portion $32a_3$ in the region Q5. As shown in FIG. 14, one circumferential projection 9(9A) which continuously and annularly extends in the circumferential direction of the tire is provided on the portion $32a_3$. Another circumferential projection 9(9B) which continuously and annularly extends in the circumferential direction of the tire is provided on the portion $32a_1$ of the sidewall portion surface 32a in the sidewall portion region Q2.

At least two radial projections 10 which extend in the radial direction of the tire and are connected to the two circumferential projections 9A and 9B are formed on the surface 32a of the sidewall portion 32 at a prescribed distance in the circumferential direction of the tire. Regions defined by the circumferential projections 9A and 9B and radial projections 10 are formed in a depression surface 11 depressed by a depth D from the surface 32a of the sidewall portion 32. The above-described marks 8 protrude from the depression surface 11 so as to project beyond the surface 2a of the sidewall portion 2.

By specifying the relationship of the curvature radii R1, R2 and Rs as described above, a portion of the sidewall portion surface 32a in the sidewall portion region Q4 from the position P2 to the position P3 can become a shape closer to a flat surface than before when a service inner pressure is applies to a tire. Therefore, by providing the above-described marks 8 in the portion of sidewall portion surface 32a in the sidewall portion region Q4, the marks 8 are more easily viewed, enabling visibility thereof to further be enhanced.

On the other hand, during curing, a tire is pressed against the inner surface of a mold by inner pressure to mold it. Since a portion of the sidewall portion 32 having the bead filler 36 is higher in rigidity than the other portion of the sidewall portion 32, the portion of the sidewall portion 32 having the bead filler 36 is pressed against the inner surface of the mold after the other portion of the sidewall portion 32 is pressed against the inner surface of the mold during curing. Therefore, air trapped between the sidewall portion surface 32a and the mold inner surface is herded between a face of the portion of the sidewall portion 32 having the bead filler 36 and the mold inner surface. Since the circumferential projection 9A is provided in a region where the air is herded, and the radial projections 10 are connected to the circumferential projection 9A, the air herded between the face of the portion of the sidewall portion 32 having the bead filler 36 and the mold inner surface is herded into the groove of the mold for molding the circumferential projection 9A, and can effectively escape outside through ventholes for air release. Accordingly, cure trouble due to air pockets produced during molding of the marks can be further improved.

Figure 15:
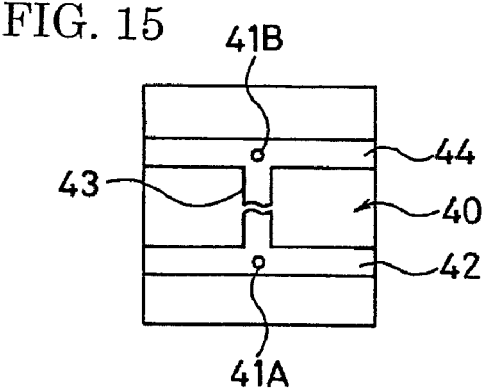
FIG. 15 is a partial enlarged view, partially omitted, of an inner surface of a mold.

More specifically, a tire, which is consequently pressed against the inner surface of a mold by a bladder and molded when cured, is apt to trap air in a part projecting from a surface of the tire. Therefore, a venthole for air release is generally provided in the bottom surface of a projection molding groove for molding the projecting part. As shown in FIG. 15, a mold 40 for molding the above heavy duty pneumatic tire when cured preferably has ventholes 41A and 41B in a portion connecting a circumferential projection molding groove 42 for molding the circumferential projection 9A and a radial projection molding groove 43 for molding a radial projection 10, and in a portion connecting a circumferential projection molding groove 44 for molding the circumferential projection 9B and the radial projection molding groove 44. The air herded between the face of the portion of the sidewall portion 32 having the bead filler 36 and the mold inner surface is herded into the circumferential projection molding groove 42 for molding the circumferential projection 9A, and can effectively escape outside through the venthole 41A for air release.

Figure 16:
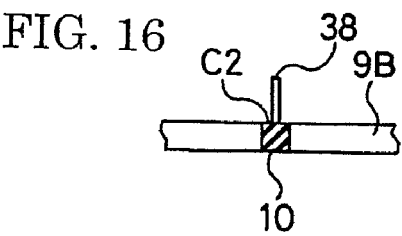
FIG. 16 is an explanatory drawing of a rubber spew formed on a connection portion of a circumferential projection and a radial projection.
Figure 17:
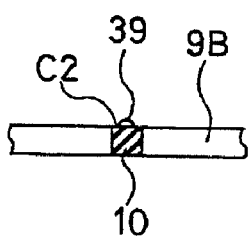
FIG. 17 is an explanatory drawing illustrating a vestige of the rubber spew of FIG. 16 that has been removed.

As a result, as shown in FIG. 16, the tire after molding and curing has rubber spews 38 formed of rubber which has flown into the ventholes for air release on a connection part C1 of the circumferential projection 9A and the radial projection 10 and on a connection part C2 of the circumferential projection 9B and the radial projection 10. As shown in FIG. 17, the tire the rubber spews of which have been removed has slightly raised vestiges 39 of the rubber spews 38.

Figure 18:
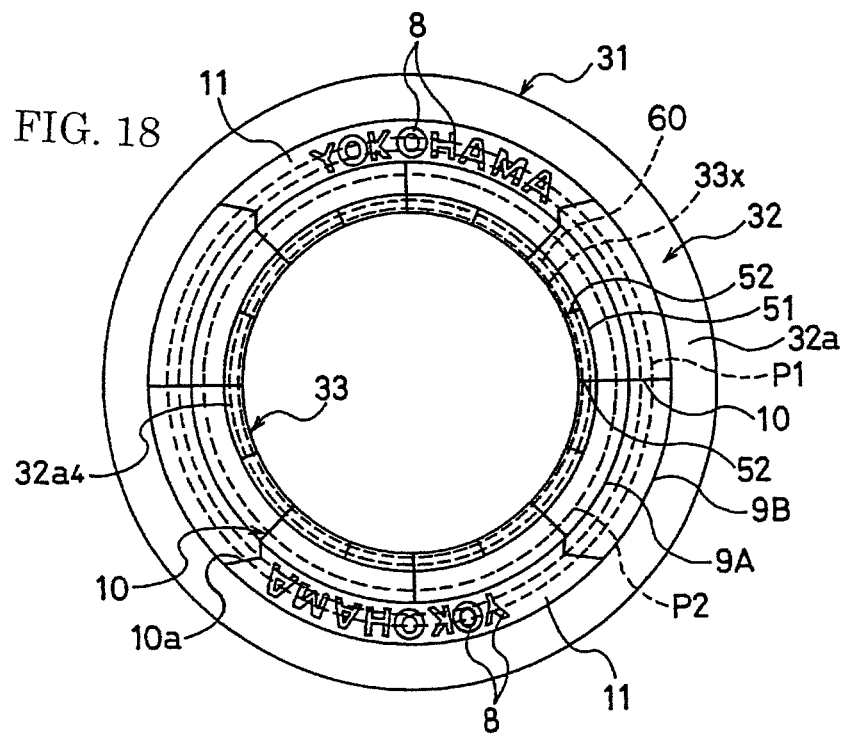
FIG. 18 is a side view showing still another embodiment of a pneumatic tire according to the present invention.
Figure 19:
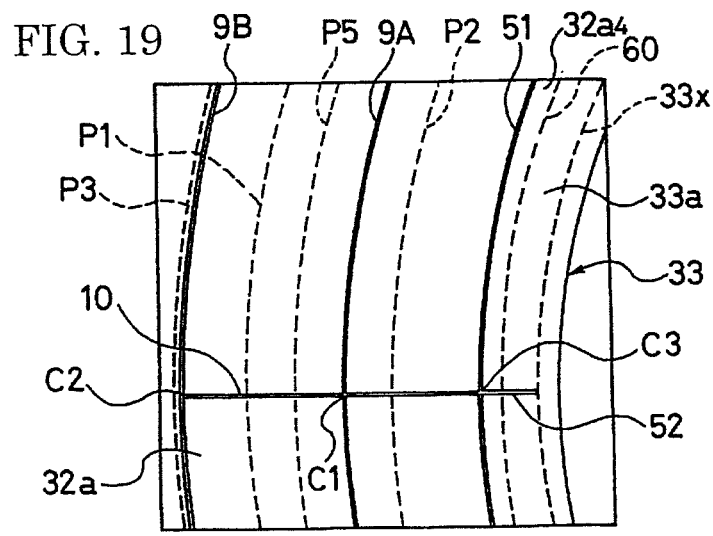
FIG. 19 is a partial enlarged view of FIG. 18.

Referring to FIGS. 18 and 19, there is shown still another embodiment of a pneumatic tire according to the present invention, used for trucks, buses and the like. The pneumatic tire of FIG. 18 is one having the following structure further added to the pneumatic tire shown in FIG. 13.

The radial projections 10 extend inward in the radial direction of the tire beyond the circumferential projection 9A, and are connected to a rim check line (annular projection) 51 for checking a fitting state of the tire to a rim, the rim check line projecting annularly in the circumferential direction of the tire on a portion $32a_4$ of the surface 32a of the sidewall portion 32 on the bead portion 33 side located inward of the position P2 in the radial direction of the tire. Some of the radial projections 10, which have portions 10a extending between the circumferential projections 9A and 9B, extend in the radial direction of the tire with the portions bent at an obtuse angle.

The above pneumatic tire is cured, generally using a mold which is divided into an upper mold section, a lower mold section, and upper and lower bead rings, or a mold which is divided into an upper mold plate, a lower mold plate, sectors, and upper and lower bead rings. In this case, a place 60 corresponding to a mold-dividing position exist in the form of an annular line on the surface 33a of the bead portion 33 inward of the rim check line 51 of the pneumatic tire in the radial direction of the tire. Sub-projections 52 extend from the rim check line 52 to the place 60 additionally. The sub-projections 52 further extend to a position 33x of a bead heel in an example shown in FIG. 19.

The tire has rubber spews 38 shown in FIG. 16 or vestiges 39 shown in FIG. 17 on connection parts C3 connecting the radial projections 10 and the rim check line 51 in addition to the connection parts C1 and C2. A mold for molding this tire is structured such that air escapes outside through ventholes for air release also at locations corresponding to the connection parts C3.

By connecting the radial projections 10 to the rim check line 51 as described above, trapped air can more easily escape outside from the grooves of the mold for molding the radial projections 10 through a groove of the mold for molding the rim check line 51. Therefore, cure trouble due to air pockets produced during molding of the marks can be still further reduced. In this case, ventholes for air release are also formed in the groove of the mold for molding the rim check line 51.

Trapped air can also escape outside from the mold-dividing position. Therefore, by further extending the sub-projections 52 from the rim check line 51 to the place 60 corresponding thereto, trapped air can still more easily escape outside, which can further reduce cure trouble due to air pockets produced during molding of the marks.

If the tire has no rim check line 51, the radial projections 10 may directly extend to the place 60.

In the present invention, the heights H1 of the marks 8 are preferably in the range of 0.2 mm to 1.5 mm. If the heights H1 of the marks 8 are less than 0.2 mm, visibility of the marks 8 is deteriorated. If the heights H1 of the marks 8 are beyond 1.5 mm, it is difficult to improve cure trouble due to air pockets created during molding of the marks.

The heights H2 and H3 of the circumferential projections 9 and radial projections 10 preferably range from 0.2 mm to 2.0 mm, respectively. If the heights H2 and H3 of the circumferential projections 9 and radial projections 10 are less than 0.2 mm, the grooves of the mold for molding the circumferential projections 9 and radial projections 10 are so less in depth that an effect of escaping trapped air outside is greatly reduced. If the heights H2 and H3 of the circumferential projections 9 and radial projections 10 exceed 2.0 mm, it is not preferably because of being apt to incur bad flow of rubber which flows into the grooves of the mold for molding the circumferential projections 9 and radial projections 10.

The widths. W2 and W3 of the circumferential projections 9 and radial projections 10 preferably range from 0.2 mm to 5.0 mm, respectively. If the widths W2 and W3 of the circumferential projections 9 and radial projections 10 are less than 0.2 mm, an effect of escaping trapped air outside is greatly reduced. If the widths W2 and W3 of the circumferential projections 9 and radial projections 10 are greater than 5.0 mm, it is not preferably because of being apt to incur bad flow of rubber which flows into the grooves of the mold for molding the circumferential projections 9 and radial projections 10.

The depth D of the depression surface 11 is preferably in the range of 0.2 mm to 1.0 mm. If the depth D of the depression surface 11 is less than 0.2 mm, visibility of the marks is deteriorated, and it is difficult to effectively improve cure trouble due to air pockets produced during molding of the marks. The depth D of the depression surface 11 is more preferably in the range of 0.4 mm to 0.8 mm.

Figure 20:
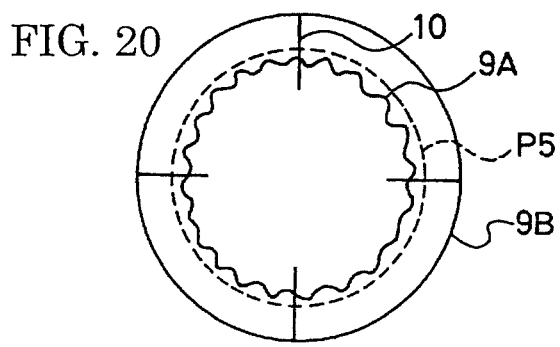
FIG. 20 is an explanatory drawing illustrating another example of circumferential projections.
Figure 21:
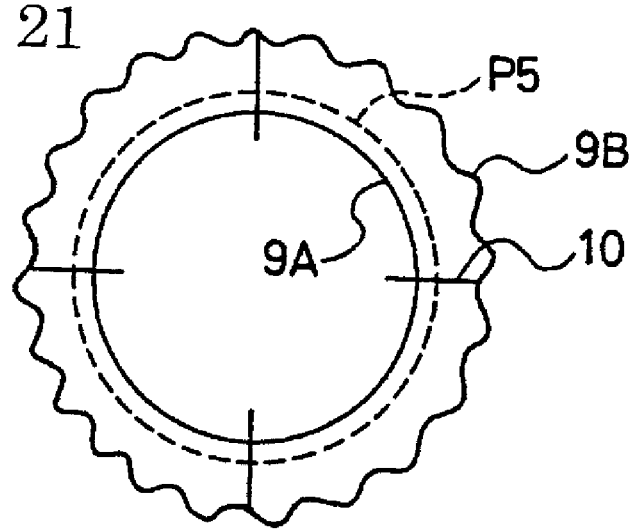
FIG. 21 is an explanatory drawing illustrating still another example of circumferential projections.

In the embodiments described above, the circumferential projections 9 are in the form of circles having a single curvature radius. However, as shown in FIGS. 20 and 21, they may annularly extend in the circumferential direction of the tire with an amplitude in the radial direction of the tire. The circumferential projections 9A and 9B extend in a wavy shape in FIGS. 20 and 21. However, they may extend bending in a zigzag shape. There is no limitation to the shapes shown in FIGS. 20 and 21.

Figure 22:
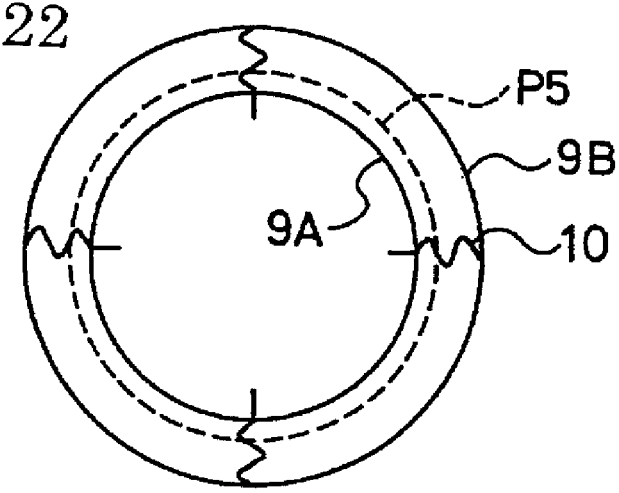
FIG. 22 is an explanatory drawing illustrating another example of radial projections.
Figure 23:
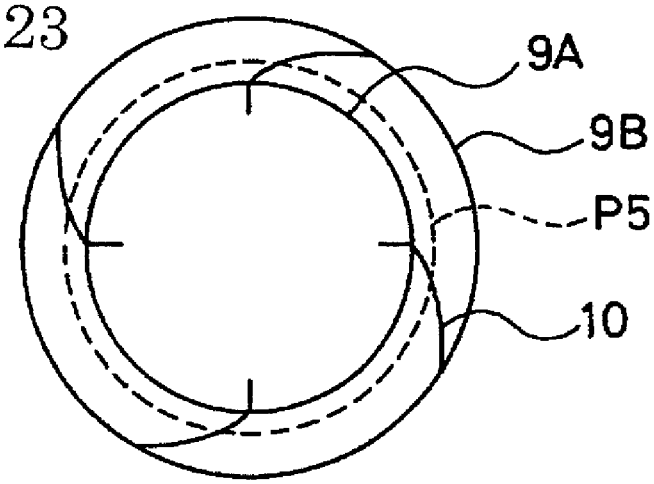
FIG. 23 is an explanatory drawing illustrating still another example of radial projections.

The radial projections 10 may have the shape of extending in a zigzag path in the radial direction of the tire as shown in FIG. 22, and may also extend in the radial direction of the tire in a manner inclined in one direction with respect to the circumferential direction of the tire as shown in FIG. 23.

The pneumatic tire shown in FIG. 13 has a structure including the rubber spews 38 or vestiges 39 of the rubber spews which have been removed on the respective connection parts of the projections 9A, 9B and 10. However, the tire may have a structure including a rubber spew 38 or vestige 39 thereof on at least one of the circumferential projections 9A and 9B and radial projections 10, preferably on at least one of the connection parts connecting the circumferential projection 9A and the radial projections 10 and the connection parts connecting the circumferential projection 9B and the radial projections 10, according to the arrangement of ventholes for air release formed in a mold. It is desirable that the pneumatic tire shown in FIG. 13 have a structure including a rubber spew 38 or vestige 39 thereof on each of the connection parts of the projections 9A, 9B and 10.

The pneumatic tire shown in FIG. 18 may also have a structure including a rubber spew 38 or vestige 39 thereof on at least one of the circumferential projections 9A and 9B, radial projections 10, rim check line 51, and sub-projections 52, preferably on one of the connection parts connecting the circumferential projection 9A and the radial projections 10, the connection parts connecting the circumferential projection 9B and the radial projections 10, the connection parts connecting the radial projections 10 and the rim check line 51, and the connection parts connecting the rim check line 51 and the sub-projections 52, according to the arrangement of ventholes for air release formed in a mold. It is more preferable that the pneumatic tire shown in FIG. 18 have a structure including a rubber spew 38 or vestige 39 thereof on each of the connection parts.

Figure 24:
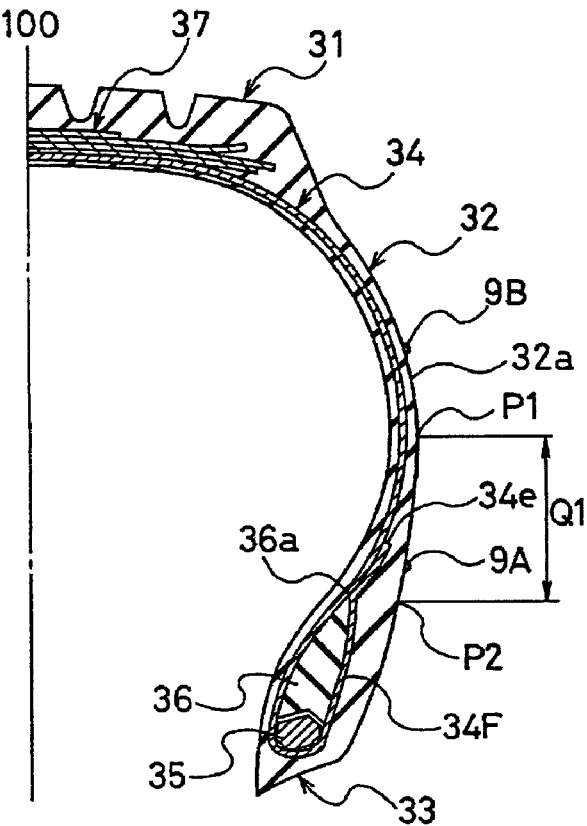
FIG. 24 is a half cross-sectional view showing still another embodiment of a pneumatic tire according to the present invention.

In each of the embodiments of FIGS. 13 and 18, the bead filler 36 is mentioned as a reinforcing member with its radially outer edge located in the region Q1. However, as shown in FIG. 24, when the radially outer edge 34e of a turned-up portion 34F of the carcass ply 34 which is turned up around a bead core 35 from the inner side toward the outer side in the axial direction of the tire and extends to the sidewall portion 32 side is located outward of the radially outer edge 36a of the bead filler 36 in the radial direction of the tire and in the sidewall portion region Q1, the radially outer edge 34e of the turned-up portion 34F of the carcass ply 34 is the radially outer edge of the reinforcing member.

Figure 25:
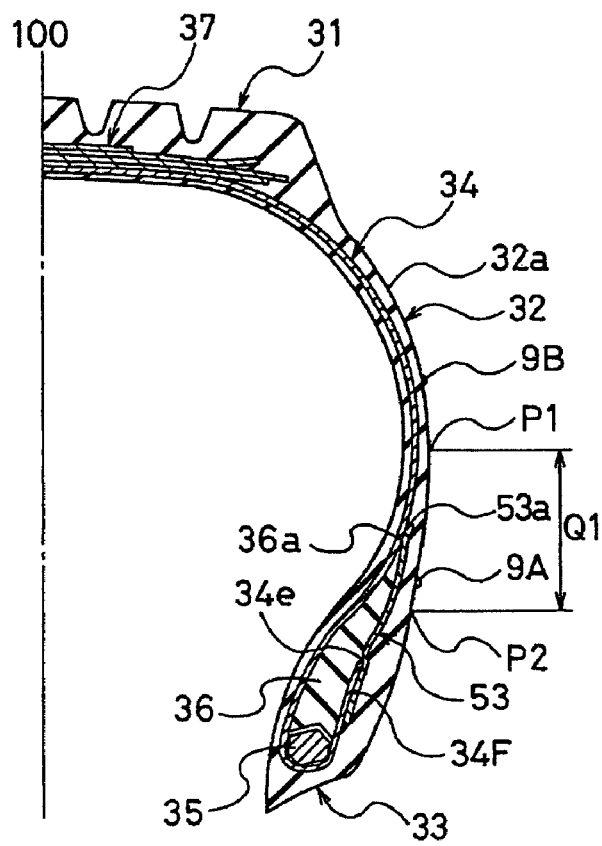
FIG. 25 is a half cross-sectional view showing still another embodiment of a pneumatic tire according to the present invention.

As shown in FIG. 25, there is embedded in the vicinity of the bead filler 36 a cord reinforcing layer 53 which extends from the bead portion 33 side to the sidewall portion 32 side and includes a rubber layer and arranged reinforcing cords (not shown) such as organic fiber cords and steel cords embedded therein, and when the radially outer edge 53a of the cord reinforcing layer 53 is located outward of the radially outer edge 36a of the bead filler 36 and the radially outer edge 34e of the turned-up portion 34F of the carcass ply 34 in the radial direction of the tire, and in the sidewall portion region Q1, the cord reinforcing layer 53 is the reinforcing member.

The above-described tire maximum width position P1, positions P2 to P5, and curvature radii R1, R2 and Rs are ones in a state where a tire is mounted on a standard rim specified by JATMA (Japan Automobile Tire Manufacturers Association), and is inflated to an air pressure of 5% of the air pressure corresponding to the maximum load capability specified by JATMA, and no load is applied thereto. The same goes for the tire cross-sectional height SH and the tire cross-sectional height Hc. The tire maximum width position P1 is a position on the surface 2a of a sidewall portion 2 where the tire is greatest in width. When a decoration such as the marks 8 is provided on the surface 2a of the sidewall portion 2, the tire maximum width position is a position on the surface 2a of the sidewall portion 2 without the decoration where the width of the tire is maximum. If it is difficult to find the position on the surface 2a of the sidewall portion 2 without the decoration where the tire is greatest in width, a position on the surface 2a of the sidewall portion 2 corresponding to a position where the carcass ply is greatest in width is the tire maximum width position P1.

EXAMPLE 1

Prepared respectively were the present invention tires 1 and 2 (present examples 1 and 2), each having a size of 11R22.5, a construction of FIG. 10, and marks of FIG. 2, in which the heights H1 of the marks, the heights H2 of the circumferential projections, the heights H3 of the radial projections, the depth D of the depression surface, the height Hn of the part surrounded by the annular projection of a mark were as shown in Table 1. Prepared also were the present invention tires 3 (present example 3) each having the same structure as the present invention tire 2 in which auxiliary projections were further provided as shown in FIG. 10, the heights H4 of the auxiliary projections being as shown in Table 1. Further prepared respectively were conventional tires 1 and 2 (conventional examples 1 and 2) each having the same structure as the present invention tire 1 except that the circumferential projections and the radial projections were not provided, and the marks were directly provided on the surface of the sidewall portion.

In each of the present invention tires 1 to 3, the sum of the volumes of portions of the marks projecting from the surface of the sidewall portion with respect to the volume of a space from the surface of the sidewall portion to the depression surface is as shown in Table 1. In each of the conventional tires 1 and 2, the heights H1 of the marks and the height Hn of the part surrounded by the annular projection of a mark are also as shown in Table 1.

The above prepared tires were mounted on standard rims specified by JATMA, and were inflated to an air pressure (700 kPa) corresponding to the maximum load capability. Feeling evaluation testing for visibility of the marks was carried out by 50 panelists. The evaluation results thereof are represented by an index where the conventional tires 1 are 100. As the index is greater, visibility is better.

The prepared tires were checked regarding the occurrence conditions of cure trouble of the marks due to air pockets, obtaining the results shown in Table 1. The occurrence conditions of cure trouble are represented by three levels of A1 to A3. A1 means that cure trouble does not happen, A2 means that the percentage of occurrence of cure trouble is less than 1%, and A3 means that the percentage of occurrence of cure trouble is 1% or more.

TABLE 1

|  | Conventional Example 1 | Conventional Example 2 | Present Example 1 | Present Example 2 | Present Example 3 |
| --- | --- | --- | --- | --- | --- |
| Mark Heights H1 (mm) | 1.0 | 1.0 | 1.0 | 1.2 | 1.2 |
| Circumferential Projection Heights H2 (mm) | — | — | 1.1 | 1.5 | 1.5 |
| Radial Projection Heights H3 (mm) | — | — | 1.0 | 1.4 | 1.4 |
| Auxiliary Projection Heights H4 (mm) | — | — | — | — | 0.4 |
| Depression surface Depth D (mm) | 0 | 0 | 0.5 | 0.5 | 0.5 |
| Surrounded Part Height Hn (mm) | 0 | 0.2 | 0 | 0.2 | 0.2 |
| Sum of Volumes of Mark Portions | — | — | 1.0 | 1.0 | 1.0 |
| Visibility | 100 | 95 | 110 | 115 | 120 |
| Cure Trouble | A3 | A3 | A2 | A2 | A1 |

As seen from Table 1, the present invention tires can enhance visibility of the marks, and reduce occurrence of cure trouble due to air pockets.

EXAMPLE 2

Prepared respectively were the present invention tires 4 and 5 (present examples 4 and 5) each having the same size as in EXAMPLE 1 and the same structure as the present invention tire 1 except that one of the two circumferential projections was disposed in the sidewall portion region Q5, the other was disposed in the sidewall portion region Q2, and the curvature radii R1 and R2 of the portions of the surface of the sidewall portion and the curvature radius Rs of the portion of the carcass ply were as shown in Table 2.

The above prepared tires were checked as in EXAMPLE 1 regarding visibility of the marks and the occurrence conditions of cure trouble of the marks due to air pockets, obtaining the results shown in Table 2. It is noted that the visibility is represented by an index where the present invention tires 4 are 100.

TABLE 2

|  | Present Example 4 | Present Example 5 |
|---|---|---|
| Curvature Radius Rs (mm) | 100 | 100 |
| Curvature Radius R1 (mm) | 150 | 150 |
| Curvature Radius R2 (mm) | 200 | 500 |
| Visibility | 100 | 105 |
| Cure Trouble | A2 | A1 |

As seen from Table 2, the present invention tires 5 having the curvature radii R1, R2 and Rs that satisfy relationships expressed by Rs<R1 and $3.0R1 \leq R2$ can further improve visibility of the marks and cure trouble due to air pockets.

Industrial Applicability

The present invention having the aforementioned excellent effects is preferably applied to pneumatic tires having marks provided on a sidewall portion.

What is claimed is:

1. A pneumatic tire including a sidewall portion having a surface, two circumferential projections extending in a circumferential direction of the tire being disposed on the surface of the sidewall portion at a prescribed distance in a radial direction of the tire, at least two radial projections extending in the radial direction of the tire and connected to the two circumferential projections being disposed at a prescribed distance in the circumferential direction of the tire between the two circumferential projections, a region defined by the circumferential projections and the radial projections being formed in a depression surface depressed from the surface of the sidewall portion, at least one mark protruding beyond the surface of the sidewall portion being provided on the depression surface, a height of the mark from the surface of the sidewall portion being equal to or less than heights of the circumferential projections from the surface of the sidewall portion and heights of the radial projections from the surface of the sidewall portion, comprising a carcass ply extending between right and left bead portions, and a reinforcing member extending from a bead portion side toward a side of the sidewall portion, the reinforcing member having a radially outer edge located in a region Q1 of the sidewall portion from a maximum width position P1 of the tire to a position P2 of ½ of a cross-sectional height He of the tire up to the tire maximum width position P1, the surface of the sidewall portion having a portion located in a region Q2 of the sidewall portion from the tire maximum width position P1 to a position P3 away therefrom outward in the radial direction of the tire by a distance of ¼ of the tire cross-sectional height Hc, the surface portion having a cross-sectional shape taken in a plane that contains an axis of rotation of the tire, the cross-sectional shape being in a form of an arc having a curvature radius R1, the surface of the sidewall portion having a portion located in the region Q1 of sidewall portion, the surface portion having a cross-sectional shape taken in a plane that contains the axis of rotation of the tire, the cross-sectional shape being in a form of an arc having a curvature radius R2, the sidewall portion having a region Q3 from a position away from the tire maximum width position P1 inward in the radial direction of the tire by a distance of ¼ of the tire cross-sectional height He to the position P3, the carcass ply having a portion in the region Q3, the carcass ply portion having a cross-sectional shape taken in a plane that contains the axis of rotation of the tire, the cross-sectional shape being in a form of an arc having a curvature radius Rs, the curvature radii R1, R2 and Rs satisfying relationships expressed by Rs<R1 and $3.0R1 \leq R2$, the mark being disposed in a region Q4 of the sidewall portion from the position P2 to the position P3, one of the two circumferential projections being disposed on a portion of the surface of the sidewall portion located in a region Q5 of the sidewall portion from a position P5 of the radially outer edge of the reinforcing member to the position P2.

2. The pneumatic tire according to claim 1, wherein the pneumatic tire is molded by a mold having ventholes for air release when cured, at least one of the circumferential projections and the radial projections having a rubber spew formed of rubber which has flown into a venthole for air release of the mold or a vestige of the rubber spew that has been removed.

3. The pneumatic tire according to claim 2, wherein at least one of connection parts of the circumferential projections and the radial projections have the rubber spew or vestige.

4. The pneumatic tire according to claim 1, wherein the pneumatic tire is molded by a mold having a divided structure when cured, and has a place corresponding to a mold-dividing position on a surface of the bead portion, the radial projections extending to the place.

5. The pneumatic tire according to claim 1, wherein the surface of the sidewall portion has a rim check line for checking a fitting state of the tire to a rim, the rim check line projecting annularly in the circumferential direction of the tire on a bead portion side located inward of the position P2 in the radial direction of the tire, the radial projections extending inward in the radial direction of the tire and being connected to the rim check line.

6. The pneumatic tire according to claim 5, wherein the pneumatic tire is molded by a mold having a divided structure when cured, and has a place corresponding to a mold-dividing position on a surface of the bead portion inward of the rim check line in the radial direction of the tire, a sub-projection extending to the place from the rim check line.

7. The pneumatic tire according to claim 6, wherein the pneumatic tire is molded by a mold having ventholes for air release when cured, at least one of the circumferential projections, radial projections, rim check line, and sub-projection having a rubber spew formed of rubber which has flown into a venthole for air release of the mold or a vestige of the rubber spew that has been removed.

8. The pneumatic tire according to claim 7, wherein at least one of connection parts of the circumferential projections and the radial projections, connection parts of the radial projections and rim check line, and a connection part of the rim check line and sub-projection has the rubber spew or vestige.

9. The pneumatic tire according to claim 1, comprising a bead core embedded in the bead portion, and a bead filler provided radially outwardly of the bead core, the bead filler extending to the sidewall portion side, the carcass ply being turned up around the bead core from an inner side of the tire toward an outer side thereof in the axial direction of the tire and extending to the sidewall portion side, the reinforcing member being one of the bead filler and carcass ply, the one has a radially outer edge which is located outward of that of the other in the radial direction of the tire and is located in the region Q1 of the sidewall portion.

10. The pneumatic tire according to claim 1, comprising a bead core embedded in the bead portion, and a bead filler provided radially outwardly of the bead core, the bead filler extending toward the sidewall portion side, the carcass ply being turned up around the bead core from an inner side of the tire toward an outer side thereof in the axial direction of the tire, a cord reinforcing layer extending from the bead portion side to the sidewall portion side being embedded in a vicinity of the bead filler, the cord reinforcing layer comprising a rubber layer and arranged reinforcing cords embedded therein, the cord-reinforcing layer having a radially outer edge which is located outward of a radially outer edge of the bead filler and a radially outer edge of the carcass ply in the radial direction of the tire and in the region Q1 of the sidewall portion, the reinforcing member being the cord reinforcing layer.

* * * * *